United States Patent [19]
Nakagawa

[11] Patent Number: 5,173,786
[45] Date of Patent: Dec. 22, 1992

[54] FACSIMILE COMMUNICATION SYSTEM

[75] Inventor: Hiroaki Nakagawa, Tama, Japan

[73] Assignee: Fujitsu Limited, Japan

[21] Appl. No.: 562,574

[22] Filed: Aug. 3, 1990

[30] Foreign Application Priority Data

Aug. 5, 1989 [JP] Japan .................................. 1-203466

[51] Int. Cl.⁵ ............................................... H04N 1/32
[52] U.S. Cl. .................... 358/405; 358/407; 358/438
[58] Field of Search ............... 358/405, 406, 407, 409, 358/412, 434, 435, 436, 437, 438, 439; 379/100; 178/21 R; 371/8.2, 11.2, 32, 33

[56] References Cited

U.S. PATENT DOCUMENTS

4,630,126 12/1986 Kaku et al. ........................... 358/406
4,868,865 9/1989 Ogawa et al. ....................... 379/100

Primary Examiner—Edward L. Coles, Sr.
Assistant Examiner—Jerome Grant, II

[57] ABSTRACT

A facsimile communication system makes a facsimile communication between a transmitting station and a receiving station. The transmitting station makes a call to the receiving station, detects a called station identification (CED) signal received from the receiving station, transmits a repeat (REP) signal to the receiving station when the called station identification (CED) signal is detected, detects whether or not the called station identification (CED) signal received from the receiving station stops within a predetermined time, and starts a facsimile transmission in conformance with a high-speed communication procedure when the stop of the called station identification (CED) signal is detected within the predetermined time. The high-speed communication procedure employs a protocol which requires less communication steps than a protocol of a standard communication procedure which is in conformance with CCITT Recommendations. The receiving station transmits the called station identification (CED) signal when the call is received from the transmitting station, detects the repeat (REP) signal received from the transmitting station, and stops the transmission of the called station identification (CED) signal when the repeat signal (REP) stops.

12 Claims, 6 Drawing Sheets

FACSIMILE COMMUNICATION SYSTEM

BACKGROUND OF THE INVENTION

The present invention generally relates to facsimile communication systems, and more particularly to a facsimile communication system which reduces the communication time by reducing the protocol.

In a conventional facsimile communication system, a facsimile communication is made in conformance with a transmission control procedure which is standardized by the CCITT Recommendations T.30 as a document facsimile transmission procedure for a general telephone switching network.

In other words, after a sequence of making a call set-up and capturing a line is made between a transmitting station and a receiving station, the transmitting station confirms the capability of the receiving station such as the transmission speed and the document size. The transmitting station transmits an image signal related to a document which is to be transmitted after checking the transmission speed which can be used for the communication on the connected line.

An example of the protocol between the transmitting and receiving stations will now be described with reference to FIG. 1. When the transmitting station dials to the receiving station and the receiving station is called, the receiving station transmits a called station identification (CED) signal having a frequency of 2100 Hz. After the CED signal ends, the receiving station transmits a digital identification (DIS) signal or a non-standard facilities (NSF) signal depending on whether the receiving station has the function of receiving in conformance with the CCITT standards or a specific function in conformance with a procedure other than the T-series CCITT Recommendations.

On the other hand, the transmitting station designates a function from the functions indicated by the DIS or NSF signal by transmitting a digital command (DCS) signal or a non-standard set-up (NSS) signal to the receiving station. After transmitting the CDS signal, the transmitting station transmits a training check (TCF) signal after a pause time which is provided to switch to a high-speed modem.

When the adjustment of the high-speed modem is completed by this training sequence, the receiving station transmits a confirmation to receive (CFR) signal and seeks transmission of the message from the transmitting station.

Therefore, a negotiation protocol (that is, phase B) of the facsimile communication is completed and the transmitting station transmits an image (PIX) signal. According to this conventional system, however, there is a problem in that it takes at least approximately 9.0 to 13.0 seconds for the negotiation protocol before the PIX signal is actually transmitted, as may be seen from FIG. 1.

However, the information quantity to be transmitted by the facsimile communication is increasing and the facsimile communication between distant stations is made more frequently due to the convenience of facsimile machines. For this reason, there are demands to reduce the communication time of the facsimile communication.

SUMMARY OF THE INVENTION

Accordingly, it is a general object of the present invention to provide a novel and useful facsimile communication system in which the problems described above are eliminated.

Another and more specific object of the present invention is to provide a facsimile communication system for making a facsimile communication between a transmitting station and a receiving station, where the transmitting station includes calling means for making a call to the receiving station, first detecting means for detecting a called station identification (CED) signal received from the receiving station, means for transmitting a repeat (REP) signal to the receiving station when the called station identification (CED) signal is detected by the first detecting means, timer means for detecting whether or not the called station identification (CED) signal received from the receiving station stops within a predetermined time, and transmission means for starting a facsimile transmission in conformance with a high-speed communication procedure when the timer means detects the stop of the called station identification (CED) signal within the predetermined time, where the high-speed communication procedure employs a protocol which requires less steps than a protocol of a standard communication procedure which is in conformance with CCITT Recommendations, and the receiving station includes means for transmitting the called station identification (CED) signal when the call is received from the transmitting station, second detecting means for detecting the repeat (REP) signal received from the transmitting station, and stop means for stopping the transmission of the called station identification (CED) signal when the second detecting means detects the repeat signal (REP). According to the facsimile communication system of the present invention, it is possible to considerably reduce the time required for the negotiation protocol of the facsimile communication. Hence, the communication cost can be reduced considerably, especially when making the facsimile communication between distant stations.

Other objects and further features of the present invention will be apparent from the following detailed description when read in conjunction with the accompanying drawings.

DESCRIPTION OF THE PREFERRED EMBODIMENTS

Figure 2:
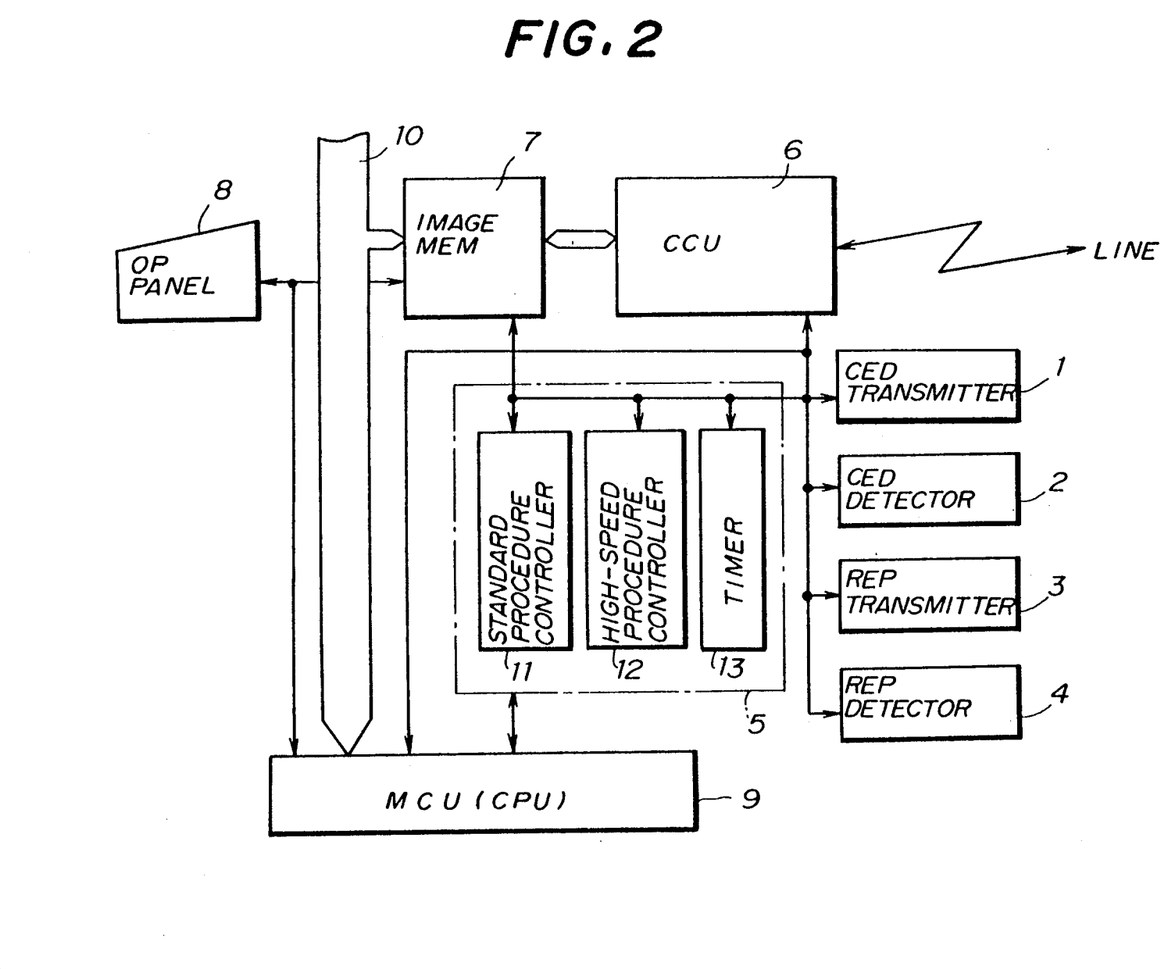
FIG. 2 is a system block diagram showing an essential part of a facsimile communication system according to the present invention for explaining an operating principle thereof.
Figure 3:
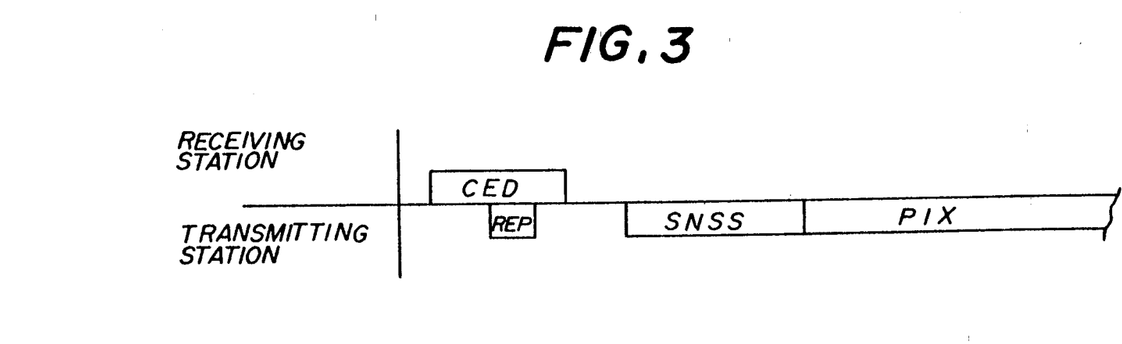
FIG. 3 is a time chart for explaining a negotiation protocol of the facsimile communication system according to the present invention.

First, a description will be given of an operating principle of a facsimile communication system according to the present invention, by referring to FIG. 2 and 3. FIG. 2 shows an essential part of the facsimile communication system, and FIG. 3 is a time chart for explaining a negotiation protocol of the facsimile communication system shown in FIG. 2. It is assumed for the sake of convenience that a transmitting station and a receiving station have the same structure.

A facsimile machine which is used as the transmitting and receiving stations includes a called station identification (CED) signal transmitter 1, a CED signal detector 2, a repeat (REP) signal transmitter 3, a REP signal detector 4, a protocol controller 5, a communication control unit 6, an image memory 7, an operation panel 8, a main control unit (central processing unit, CPU) 9 and a bus 10 which are connected as shown in FIG. 2. The protocol controller 5 includes a standard procedure protocol controller 11, a high-speed procedure controller 12 and a timer 13.

When the transmitting station calls the receiving station, the CED signal transmitter 1 of the receiving station transmits the CED signal. When this CED signal is detected by the CED signal detector 2 of the transmitting station, a check is made to determine whether or not the receiving station can operate in conformance with the high-speed communication procedure employed in the present invention. In other words, the transmitting station transmits the REP signal from the REP signal transmitter 3 thereof to the receiving station, and at the same time, starts the timer 13 of the transmitting station.

When the receiving station is able to operate in conformance with the high-speed communication procedure and when the REP signal detector 4 of the receiving station receives the REP signal from the transmitting station, the receiving station controls the CED signal transmitter 1 thereof to stop transmitting the CED signal.

When the transmitting station confirms that the transmission of the CED signal from the receiving station stops within a preset time of the timer 13 of the transmitting station, the transmitting station judges or determines that the receiving station is able to operation in conformance with the high-speed communication procedure. In this case, the transmitting station controls the high-speed procedure protocol controller 12 and transmits a super non-standard set-up (SNSS) signal and thereafter transmits an image (PIX) signal as shown in FIG. 3.

The high-speed training check is omitted. For this reason, the high-speed communication procedure employs the error retransmission procedure by the frame transmission. When the receiving station stops transmitting the CED signal at the time when the REP signal is detected, the receiving station temporarily stores the subsequent PIX signal into the image memory 7 via the communication control unit 6 when the SNSS signal is detected, because the receiving station already recognizes that the SNSS signal will be received.

Therefore, the PIX signal which is stored in the image memory 7 is restored in a known compression/expansion part (not shown) of the facsimile machine and is recorded by a known recording part (not shown).

The various control operations described above are made by the CPU 9.

Figure 1:
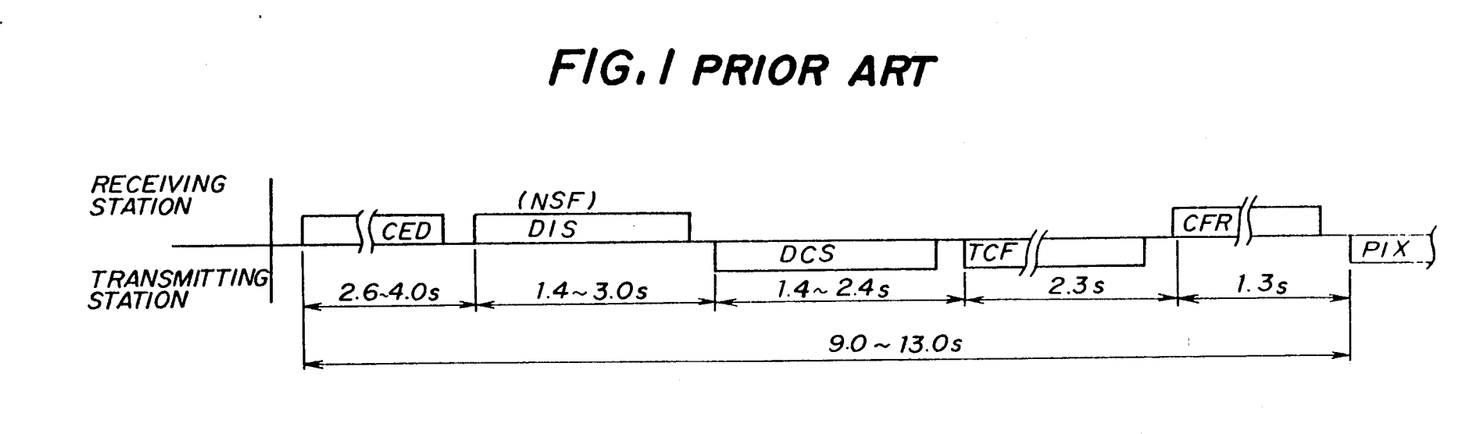
FIG. 1 is a time chart for explaining a negotiation protocol of a conventional facsimile communication system.

According to the present invention, the protocol part related to the DIS signal, the DCS signal, the TCF signal and the like of the conventional protocol shown in FIG. 1 can be omitted in the negotiation protocol which is employed in the present invention, as may be seen from FIG. 3. As a result, the communication time required for the negotiation protocol is reduced considerably.

Figure 4:
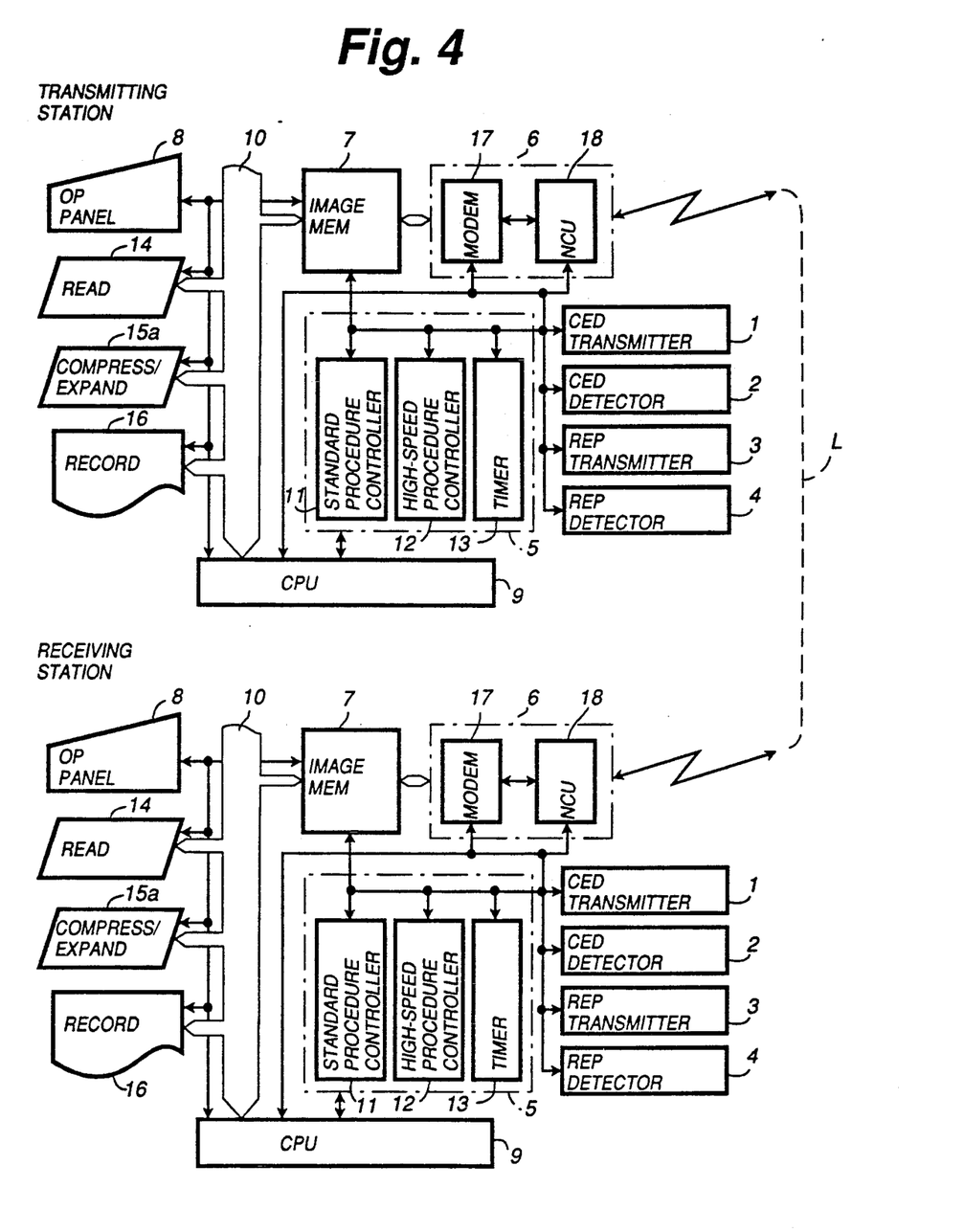
FIG. 4 is a system block diagram showing an embodiment of the facsimile communication system according to the present invention.

Next, a description will be given of an embodiment of the facsimile communication system according to the present invention, by referring to FIG. 4. In FIG. 4, those parts which are essentially the same as those corresponding parts shown in FIG. 2 are designated by the same reference numerals, and a description thereof will be omitted.

The transmitting station and the receiving station include in addition to those elements shown in FIG. 2 a reading part 14, a compression/expansion part 15a and a recording part 16 which are coupled to the bus 10. In addition, the communication control unit 6 includes a modem 17 and a network control unit 18.

The image memory 7 stores the image signal which is output from the reading part 14 which reads a document which is to be transmitted. The image memory 7 also stores the image signal which is compressed in the compression/expansion part 15a and the image signal which is received via dashed line L. The operation panel 8 includes butt for inputting various operation signals of the facsimile machine, ten-keys for inputting a telephone number and the like.

The main control unit 9 carries out a general control of the transmission and reception processes of the facsimile machine.

The compression/expansion part 15a compresses the image signal received from the reading part 14 in conformance with a modified READ coding, for example. In addition, the compression/expansion part 15a restores the compressed image signal back into the original image signal by making an expansion process.

The recording part 16 records on a recording paper the original image signal which is restored by the compression/expansion part 15a.

For example, a signal having a predetermined frequency is used as the REP signal. In this case, the REP signal detector 4 can detect the REP signal by use of a frequency counter, and a counted value of the frequency counter corresponding to the REP signal becomes a REP signal detection signal.

In order to omit the procedure of confirming the capability of the receiving station in the negotiation protocol, the basic functions are determined beforehand in the transmitting and receiving stations.

With regard to the size of the document which is transmitted and received, the following measures are taken, for example. In other words, when the receiving station can record on A4 size recording paper, arrangements are made so that the receiving station is able to receive documents in A3, B4 and A4 sizes. It is prearranged that the receiving station reduces the received A3 document and records the document on the A4 size recording paper, and reduces the received B4 document and records the document on the A4 size recording paper. Such a reduction of the document size when recording the received document can be realized by known means, and a description thereof will be omitted. The above described arrangements are inserted within the frame of the SNSS signal, so that no negotiation is necessary between the transmitting and receiving stations to recognize each other's capabilities and functions.

Similarly, when the receiving station can record on B4 size recording paper, arrangements are made so that the receiving station is able to receive documents in A3, B4 and A4 sizes. It is prearranged that the receiving station reduces the received A3 document and records the document on the B4 size recording paper, and records the received A4 document as it is on the B4 size recording paper.

Arrangements are also made beforehand with regard to the line density. No negotiation is necessary between the transmitting and receiving stations when the receiving station is able to receive the document in any line density and the line density selected by the transmitting station is inserted within the frame of the SNSS signal which is transmitted prior to the image signal. Alternatively, the line density to be used may be fixed to $8 \times 3.851$ lines/mm, for example.

Furthermore, arrangements are also made beforehand with regard to the compression system. No negotiation is necessary when the selected compression system is inserted within the frame of the SNSS signal. For example, the compression system may be selected from the modified READ (MH) coding, the modified Huffman (MR) coding and the modified modified READ (MMR) coding.

Similar arrangements are also made beforehand with respect to the communication speed. In other words, the starting communication speed is determined beforehand between the transmitting and receiving stations. The arrangements are made so that the retransmission is made every time an error is generated and the communication speed is reduced from 9600 bps to 7200 bps, for example, when a predetermined number of errors are generated. The changing of the communication speed may be realized by known means.

The high-speed procedure controller 12 carries out a control to insert within the frame of the SNSS signal the transmission instructions which are determined in accordance with the capabilities prearranged between the transmitting and receiving stations.

Next, a description will be given of the operation of the system shown in FIG. 4 by referring to FIGS. 5A and 5B respectively showing the operations of the transmitting and receiving stations.

Figure 5A:
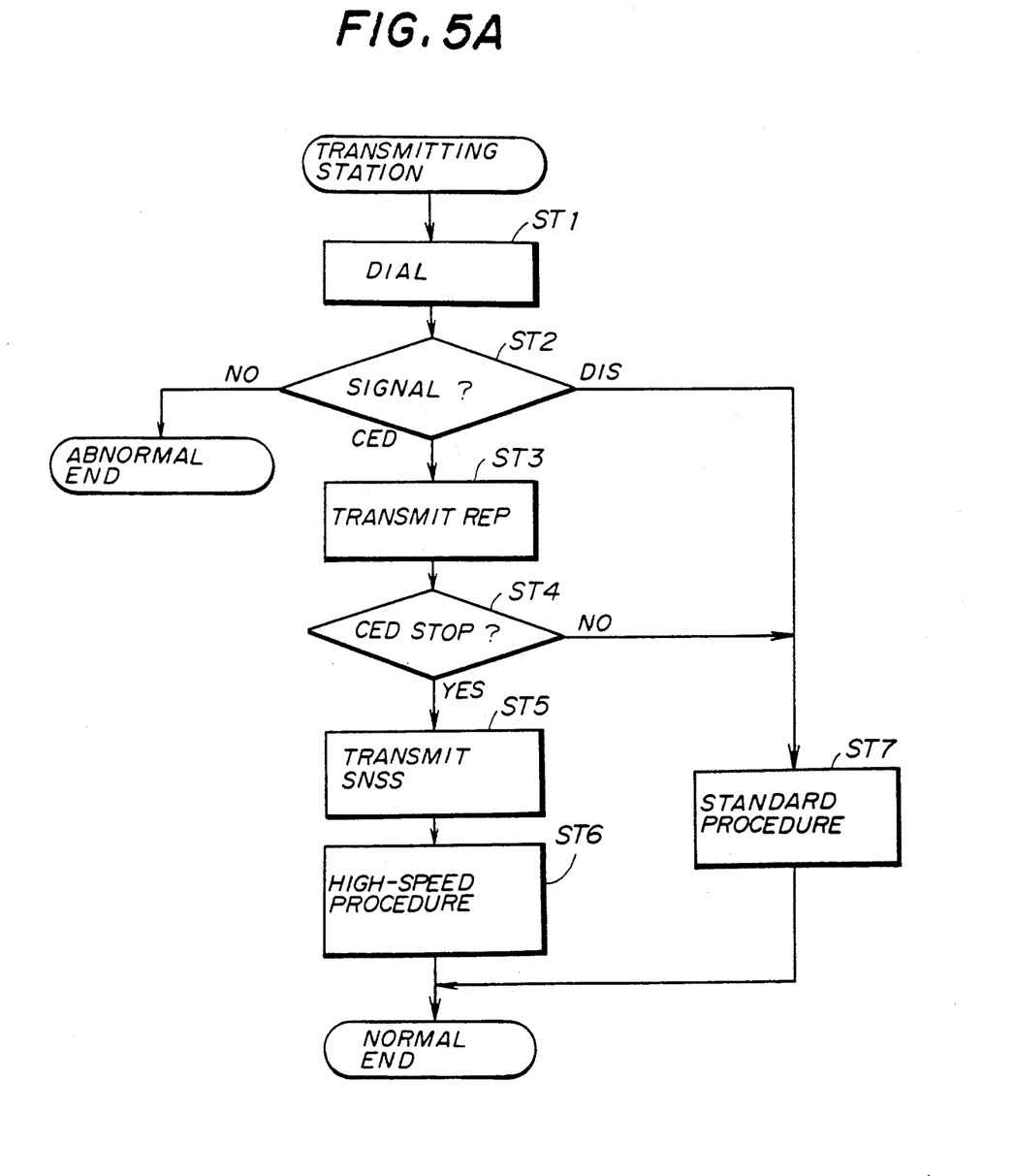
FIGS. 5A and 5B respectively are flow charts for explaining operations of a transmitting station and a receiving station in FIG. 4.
Figure 5B:
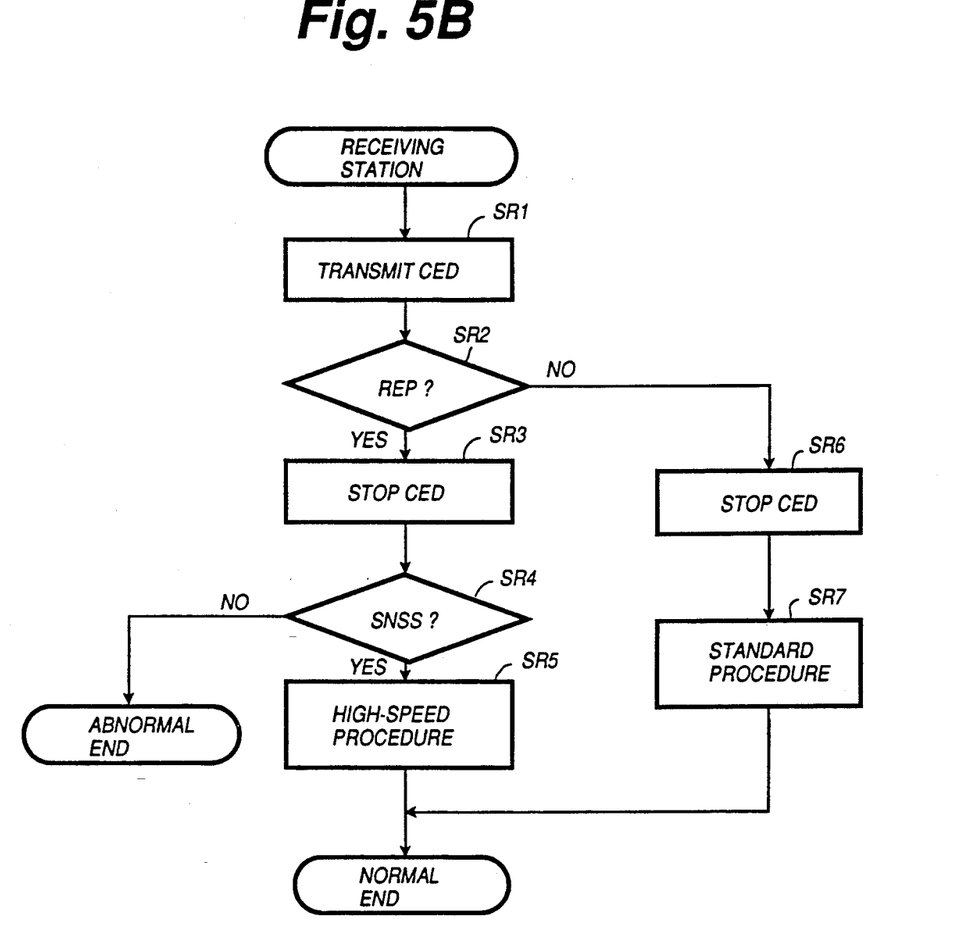

When the transmitting station dials the telephone number of the receiving station by manipulating the ten-keys of the operation panel 8 and calls the receiving station in a step ST1 shown in FIG. 5A, the receiving station immediately transmits the CED signal having a frequency of 2100 Hz from the CED signal transmitter 1 in a step SR1 shown in FIG. 5B.

The transmitting station waits for the receipt of a signal from the receiving station in a step ST2 shown in FIG. 5A. When the transmitting station receives no signal from the receiving station within a predetermined time, an abnormality is detected and the process shown in FIG. 5A ends. On the other hand, when the CED signal detector 2 of the transmitting station detects the CED signal from the receiving station, the REP signal transmitter 5 transmits under the control of the CPU 9 the REP signal having a frequency of 3300 Hz after a time of 0.3 second, for example, in a step ST3. At the same time, the CPU 9 of the transmitting station starts the timer 13 thereof.

The receiving station judges whether or not the REP signal is received from the transmitting station in a step SR2 shown in FIG. 5B. The REP signal detector 4 of the receiving station includes an internal frequency counter and the REP signal is detected by counting the frequency. When the REP signal is detected, the CPU 9 controls the CED signal transmitter 1 of the receiving station to immediately stop transmitting the CED signal in a step SR3 shown in FIG. 5B.

On the other hand, the transmitting station judges whether or not the CED signal stops within a predetermined time preset in the timer 13 of the transmitting station in a step ST4 shown in FIG. 5A. When the judgement result in the step ST4 is YES, a step ST5 starts the high-speed procedure controller 12 of the protocol controller 5 so as to transmit the SNSS signal. Then, a step ST6 shown in FIG. 5A carries out a high-speed communication procedure so as to transmit the image (PIX) signal next to the SNSS signal. The SNSS signal includes the transmission instructions which are based on the functions and capabilities such as the transmission speed which are prearranged between the transmitting and receiving stations.

Of course, the PIX signal is obtained in the transmitting station prior to the step ST6 as follows. That is, the document which is to be transmitted is read by the reading part 14 and the image signal output therefrom is temporarily stored in the image memory 7. The stored image signal is compressed in the compression/expansion part 15a in conformance with the prearranged compression system and stored again in the image memory 7. The compressed image signal is then transmitted as the PIX signal via the modem 17 and the network control unit 18 of the communication control unit 6.

On the other hand, in the receiving station, a step SR4 shown in FIG. 5B judges whether or not the SNSS signal is received. When no SNSS signal is received within a predetermined time, an abnormality is detected and the process shown in FIG. 5B ends. It is known on the receiving station end that the transmitting station will transmit the PIX signal next to the SNSS signal if the transmission of the CED signal stops within the predetermined time. For this reason, when the judgement result in the step SR4 is YES, a step SR5 carries out a high-speed communication procedure so as to receive the signals from the transmitting station. Particularly, when the receiving station detects the SNSS signal, the receiving station temporarily stores the PIX signal which is received next to the SNSS signal into the image memory via the network control unit 18 and the modem 17 of the receiving station. The stored PIX signal is restored back into the original image signal in the compression/expansion part 15a and is recorded on the recording paper by the recording part 16.

In FIG. 5A, when a digital identification (DIS) signal is received at the step ST2 or the CED signal does not stop within the predetermined time at the step ST4, the process advances to a step ST7. The step ST7 carries out the standard facsimile transmission procedure of the facsimile machine in conformance with the CCITT Recommendations by controlling the standard procedure controller 11 of the protocol controller 5 by the main control unit 9. In this case, the conventional negotiation protocol (phase B) is carried out as described in conjunction with FIG. 1, and the process ends.

Thus, the facsimile communication system is compatible with the existing facsimile machines which are not provided with the high-speed procedure controller 12 and is provided with only the standard procedure controller 11.

In FIG. 5B, when no REP signal is received at the step SR2, it is judged that the receiving station is designed to operate only in conformance with the CCITT Recommendations. Hence, a step SR6 stops transmitting the CED signal and a step SR7 carries out the standard facsimile reception procedure of the facsimile machine in conformance with the CCITT Recommendations by controlling the standard procedure controller 11 of the protocol controller 5 by the main control unit 9. In this case, the conventional negotiation protocol (phase B) is carried out as described in conjunction with FIG. 1.

As described above, the SNSS signal includes the transmission instructions which are based on the functions and capabilities which are prearranged between the transmitting and receiving stations, such as the paper size, the line density, the compression system and the communication speed. The high-speed procedure controller 12 includes a processor (not shown) and a memory (not shown) which stores programs of the processor, and decodes the SNSS signal. Hence, the transmission of the PIX signal is controlled depending on the functions and capabilities which are prearranged between the transmitting and receiving stations.

Figure 6:
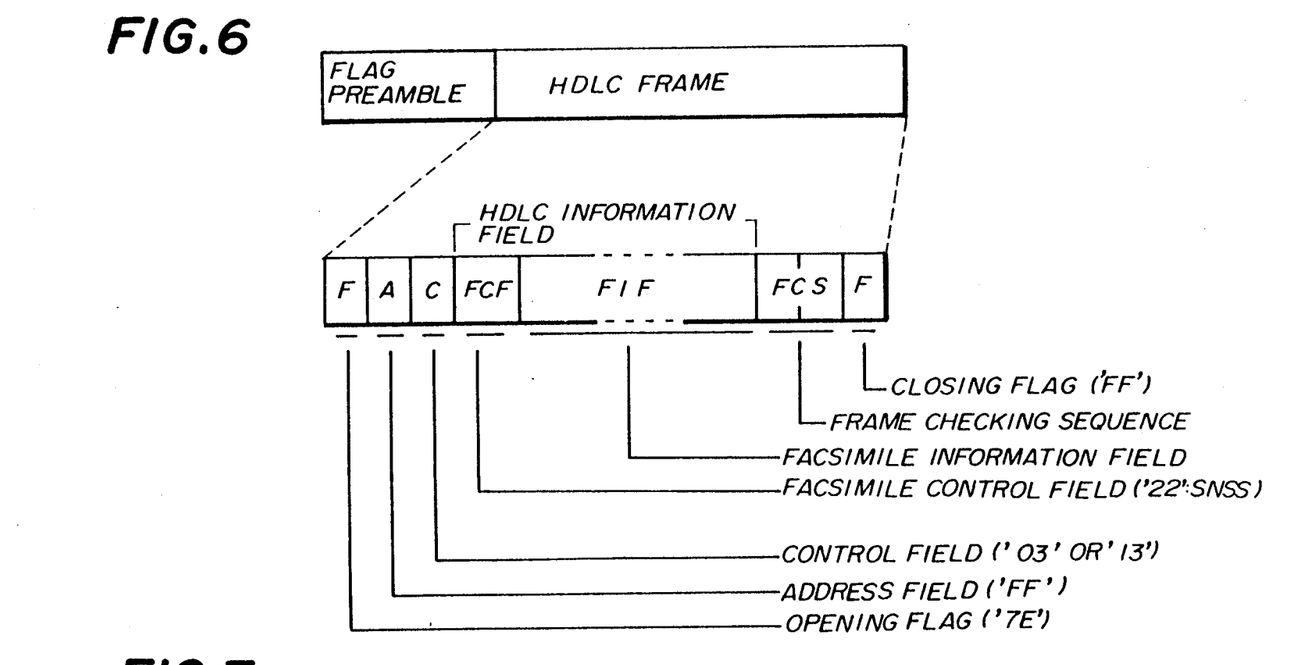
FIG. 6 shows an embodiment of a signal format of an SNSS signal.

FIG. 6 shows an embodiment of a signal format of the SNSS signal. As shown, the SNSS signal is made up of the high-level data link control procedures (HDLC) frame of the high-speed signals (9600/7200/4800/2400 bps) in conformance with the CCITT Group-3 Mode. The SNSS signal includes an opening flag F ('7E'), an address field A ('FF'), a control field C ('03' or '13'), a facsimile control field FCF ('22':SNSS), a facsimile information field FIF, a frame checking sequence FCS, and a closing flag F ('FF'). The facsimile control field FCF and the facsimile information field FIF make up an HDLC information field. The SNSS signal is transmitted in the facsimile control field FCF, and the transmission instructions are inserted within the frame of the SNSS signal in the facsimile information field FIF.

Figure 7:
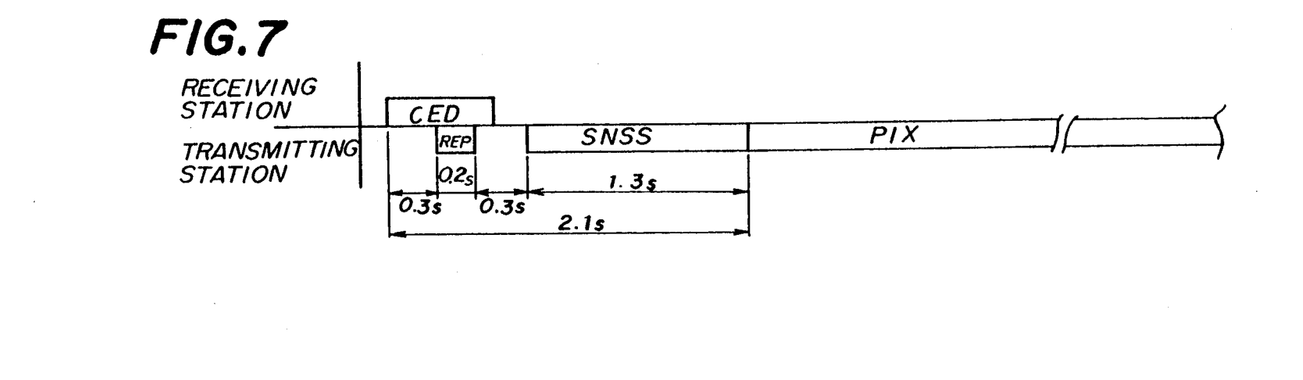
FIG. 7 is a time chart for explaining a negotiation protocol of the embodiment.

FIG. 7 is a time chart for explaining the negotiation protocol of this embodiment. As may be seen from FIG. 7, the time required for the negotiation protocol is only approximately 2.1 seconds. Thus, compared to the conventional negotiation protocol shown in FIG. 1, the time required for the negotiation protocol is reduced by approximately 6.9 to 10.9 seconds which is a considerable reduction of time. This means that the communication cost can be reduced considerably by the considerable reduction of the time required for the negotiation protocol.

For example, the receiving station may record on the A4 size recording paper only. In this case, when the transmitting station transmits the document of B4 size, the receiving station reduces the size of the B4 document to approximately 81% by known means so that the received document may be recorded on the A4 size recording paper.

In addition, when no arrangements are made beforehand with regard to the line density between the transmitting and receiving stations, the line density may be fixed to 8×3.851 lines/mm.

For example, the starting communication speed may be set to 9600 bps. In this case, the modem 17 of the receiving station operates at 9600 bps. When an error exists in the received image frame, the receiving station makes a retransmission request. Although not shown in FIG. 4, the receiving station includes a counter for counting the number of retransmission requests made from the receiving station. When the number of transmission requests exceeds a predetermined value, the transmitting station reduces the communication speed to 7200 bps in response to a signal from the receiving station.

As an alternative method of omitting the procedure of confirming the functions of the transmitting and receiving stations in order to carry out the high-speed communication procedure, the capabilities and functions of the receiving station (facsimile machine) may be registered beforehand in a memory of the transmitting station together with the telephone number of the receiving station. In this case, it is possible for the transmitting station to transmit the document depending on the stored capabilities and functions of the receiving station identified by the telephone number.

Of course, the REP signal is not limited to a tone signal having the frequency of 3300 Hz, and any signal can be used as long as the REP signal can be distinguished from the CED signal.

Further, the present invention is not limited to these embodiments, but various variations and modifications may be made without departing from the scope of the present invention.

What is claimed is:

1. A facsimile communication system for making a facsimile communication comprising:
   a transmitting station; and
   a receiving station connected to said transmitting station,
   said transmitting station including:
      calling means for making a call to said receiving station;
      first detecting means for detecting a called station identification signal received from said receiving station;
      repeat (REP) means for transmitting a predetermined signal to said receiving station when the called station identification signal is detected by said first detecting means indicating implementation of a high-speed communication procedure;
      timer means for detecting whether the called station identification signal received from said receiving station stops within a predetermined time; and
      transmission means for starting a facsimile transmission in conformance with the high-speed communication procedure when said timer means detects the stop of the called station identification signal within said predetermined time, said high-speed communication procedure employing a protocol having protocol steps which execute the high speed communication procedure,
   wherein said receiving station including:
      identification signal transmitting means for transmitting the called station identification signal when the call is received from said transmitting station;
      second detecting means for detecting the repeat (REP) signal received from said transmitting station indicating that the protocol is employed in the high-speed communication procedure; and
      stop means for stopping the transmission of the called station identification signal when said second detecting means detects the repeat (REP) signal.

2. The facsimile communication system as claimed in claim 1, wherein said transmission means of said transmitting station starts the facsimile transmission in conformance with the standard communication procedure when said first detecting means does not detect the called station identification signal received from said receiving station.

3. The facsimile communication system as claimed in claim 1, wherein said transmission means of said transmitting station starts the facsimile transmission in conformance with the standard communication procedure when said timer means does not detect the stopping of the called station identification signal received from said receiving station within said predetermined time.

4. The facsimile communication system as claimed in claim 1, wherein said transmission means of said transmitting station performs the facsimile transmission in conformance with the high-speed communication procedure by transmitting a super non-standard set-up signal which is followed by transmitting an image signal.

5. The facsimile communication system as claimed in claim 4, wherein said super non-standard set-up signal includes a transmission instruction which is determined in accordance with functions and capabilities prearranged between said transmitting station and said receiving station.

6. The facsimile communication system as claimed in claim 5, wherein said transmission instruction includes at least one of paper size, line density, compression system and communication speed to be used for the facsimile communication.

7. The facsimile communication system as claimed in claim 1, wherein said repeat (REP) signal is distinguishable from said called station identification signal.

8. The facsimile communication system as claimed in claim 1, wherein said receiving station further comprises starting means for starting a facsimile reception in conformance with a standard communication procedure when said second detecting means does not detect the repeat (REP) signal.

9. The facsimile communication system as claimed in claim 1, wherein said receiving station further comprises starting means for starting a facsimile reception in conformance with the high-speed communication procedure when said stop means stops transmitting the called station identification signal.

10. The facsimile communication system as claimed in claim 1, wherein said transmission means of said transmitting station performs the facsimile transmission in conformance with the high-speed communication procedure by transmitting a super non-standard set-up signal which is followed by an image signal, and said receiving station further comprises third detecting means for detecting the super non-standard set-up signal received from said transmitting station and starting means for starting a facsimile reception in conformance with the high-speed communication procedure when said third detecting means detects the super non-standard set-up signal.

11. The facsimile communication system as claimed in claim 10, wherein said protocol of the high-speed communication procedure only requires a specific time for transmitting and receiving the called station identification signal, the repeat (REP) signal and the super non-standard set-up signal.

12. The facsimile communication system as claimed in claim 11, wherein said specific time is 2.1 seconds or less.

* * * * *

UNITED STATES PATENT AND TRADEMARK OFFICE
CERTIFICATE OF CORRECTION

PATENT NO. : 5,173,786

DATED : December 22, 1992

INVENTOR(S) : Nakagawa

It is certified that error appears in the above-identified patent and that said Letters Patent is hereby corrected as shown below:

Col. 3, line 6, "FIG." should be --FIGS.--.

Col. 4, line 23, after "unit" insert --(NCU)--;

line 30, "butt" should be --buttons--.

Col. 5, line 28, "(MR)" should be --(MH)--.

Col. 7, line 29, delete "30".

Signed and Sealed this

Twenty-ninth Day of November, 1994

Attest:

BRUCE LEHMAN

*Attesting Officer*  *Commissioner of Patents and Trademarks*